UNITED STATES PATENT OFFICE.

JAMES P. JONES, OF ST. LOUIS, MISSOURI.

MEDICAL COMPOUND.

SPECIFICATION forming part of Letters Patent No. 367,406, dated August 2, 1887.

Application filed March 28, 1887. Serial No. 207,250. (No specimens.)

*To all whom it may concern:*

Be it known that I, JAMES P. JONES, a citizen of the United States, residing in the city of St. Louis and State of Missouri, have invented a new and useful composition of matter to be used in and for the treatment of cancer, catarrh, and erysipelas, the bite of the rattlesnake, and of other venomous reptiles and insects, wounds—including those caused by rusty nails and other rusty articles—and cuts and bruises; of which said composition I do hereby declare the following specification is a full, clear, and exact description, which will enable others skilled in the art to which it appertains to make, compound, and use the same.

My composition consists of the following ingredients, combined in the proportions stated, viz: Mexican claret wine, one ounce; lunar caustic, one grain; oil globe-cactus, one dram; oil agave, one dram. These ingredients should be placed in a vessel together and heated to a temperature of 100° Fahrenheit, and at that temperature mixed by stirring gently for ten or fifteen minutes. It should then be allowed to stand for about twenty-four hours, when it will be ready for use, or to be put up and preserved until needed.

By "Mexican claret wine" I mean the claret wine which is made in the Republic of Mexico. I have found this kind of claret best adapted for use in making my composition; but it can be made by the use of any claret wine in the same proportion.

In using this composition apply it externally to the diseased or injured part with some soft object, such as a camel-hair brush, feather, piece of cotton goods, &c.

It is impossible to prescribe rigid rules in reference to the frequency of the applications, as this will depend, in many cases, on the nature and severity of the disease or injury, and must be left to the judgment of the person using the composition. However, in treating a bruise, cut, or wound, one application is ordinarily sufficient, but other applications may be made at intervals of about two or three hours when necessary. In treating bites from venomous reptiles or insects, external poisonings, and wounds caused by rusty nails or articles, the application should be made as soon as possible after the injury, and repeated at intervals of about two or three hours, until no soreness or pain remains, and this will usually be effected by one application in about twenty minutes. In treating cancer, catarrh, or erysipelas with this composition one application every twenty-four hours is usually sufficient; but in violent or intractable cases the application may be made every twelve hours until the disease begins to yield to the treatment, and then every twenty-four hours thereafter.

What I claim, and desire to secure by Letters Patent of the United States, is—

The above-described composition of matter, consisting of Mexican claret wine, lunar caustic, oil globe-cactus, and oil agave, in substantially the proportions above described and specified.

JAMES P. JONES.

Witnesses:
ARCHIBALD G. DOUGLASS,
CHAS. G. B. DRUMMOND.